April 5, 1966     R. V. MATHISON     3,244,057
DRIVE-TYPE SCREW FASTENER
Filed Oct. 2, 1963
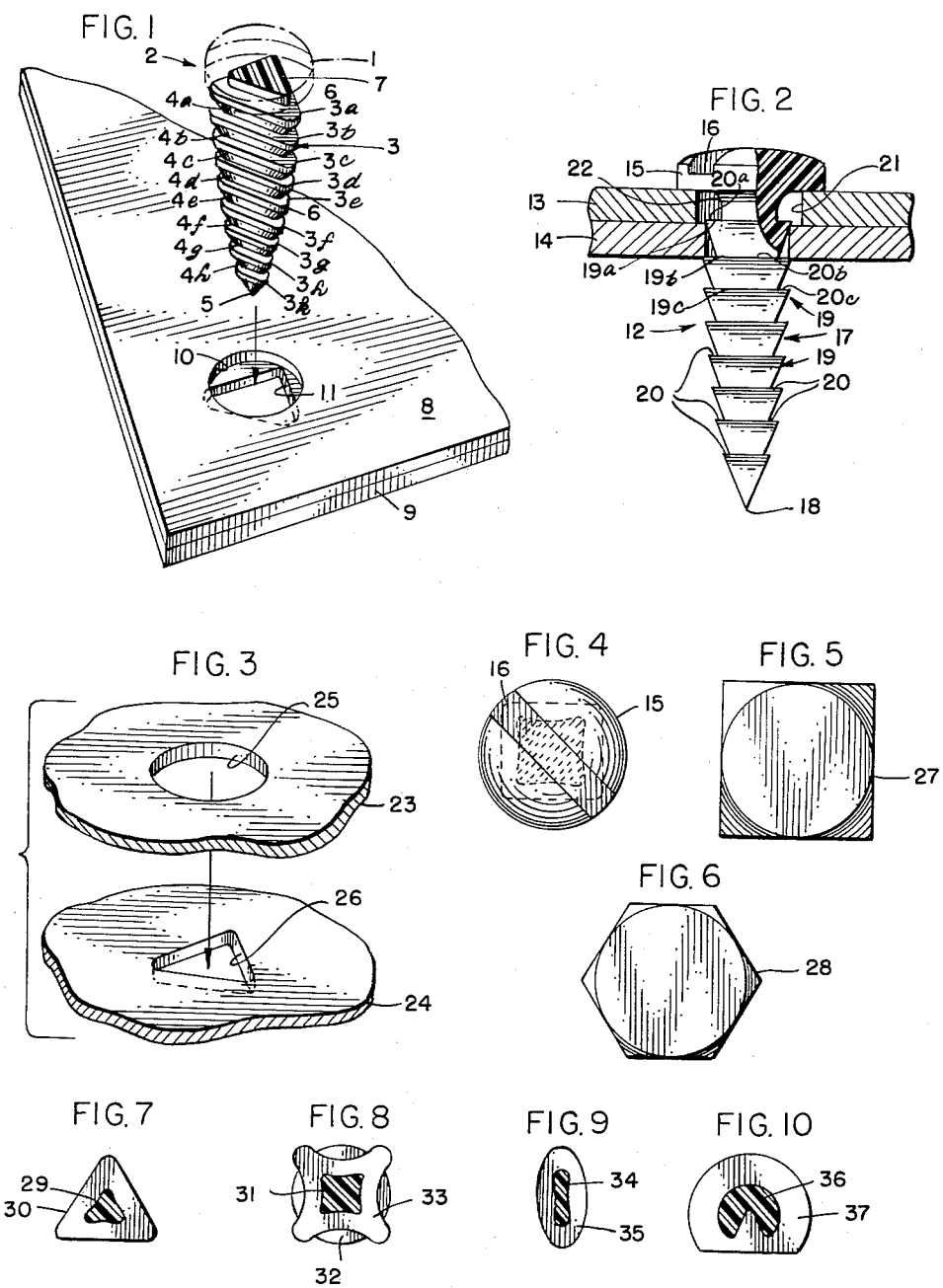
INVENTOR:
ROBERT V. MATHISON
BY
ATT'YS

United States Patent Office 3,244,057
Patented Apr. 5, 1966

3,244,057
DRIVE-TYPE SCREW FASTENER
Robert V. Mathison, 5 Woodcrest Road, Asheville, N.C.
Filed Oct. 2, 1963, Ser. No. 313,380
8 Claims. (Cl. 85—5)

This invention relates to drive fasteners, and in particular to drive-type fasteners, and combinations thereof with members held together by said fasteners, as well as methods for securing said members together with said fasteners.

It is an object of the present invention to provide improvements in drive fasteners adapted to be driven in place with hammers and the like.

Another object of the present invention is to provide a drive-type fastener, the head portion of which is separable from the shank portion by rotation of the head portion relative to the shank portion.

Still another object is to provide a drive-type screw fastener of the character hereinbefore described, which is made from elastically deformable materials, e.g., thermoplastic synthetic polymers.

A further object is to provide a drive-type fastener in combination with two members having preformed apertures therein and held together by said fastener.

Another object is to provide a drive-type fastener which, when utilized to hold two members together, as hereinbefore described, is easily removable therefrom by severing the head portion of the drive-type fastener.

These and other objects and advantages of the present invention will be apparent from the following description, taken in conjunction with the drawings, in which:

FIG. 1 is a partially exploded, perspective view of one embodiment of the present novel drive-type fastener, and two members held together therewith;

FIG. 2 is a sectional view, with portions broken away, of another fastener embodiment of the present invention holding two members together;

FIG. 3 is an exploded, perspective view of fragments of two members, each with a preformed aperture, adapted to be held together by the present novel drive-type fastener;

FIG. 4 is a top elevation of the embodiment of the invention shown in FIG. 2;

FIGS. 5 and 6 are top plan views of other types of heads for the drive-type fastener herein disclosed; and FIGS. 7, 8, 9 and 10 are cross-sectional views of other embodiments of the shank portions of the drive-type fastener herein described.

Broadly described, the invention is a drive-type screw fastener with a head portion adapted to be grasped and turned. The screw fastener has a shank portion with a plurality of longitudinally spaced, transverse shoulders of noncircular cross-section formed thereon. A breakable neck portion is provided between and integral with the head portion and the shank portion. The neck portion is of such design that when the head portion is turned relative to the shank portion, the neck portion breaks, permitting separation of the head portion from the shank portion.

The drive-type screw fastener is particularly suited to be used in fastening together members with preformed openings therein. Thus, a member, with an opening which permits the shank and neck portions, but not the head portion, of the screw fastener to pass and/or be driven therethrough, may be fastened to a second member with an opening therein of a noncircular configuration complementary to the shoulder portions of the screw fastener. This is accomplished by driving the fastener through the openings, with a hammer or other driving implement, until the head portion of the fastener is flush against the first member. The shank member is anchored in the opening in the second member, a shoulder on the shank portion which has passed through the opening bearing against the face of the second member about the opening in the second member.

The two members may easily be separated by rotating the head portion of the screw fastener, thereby severing the head portion of the fastener from the shank portion by breakage of the neck portion. The shank portion, remaining in the opening in the second member, may then be driven out by use of an appropriate driving implement.

Referring to the drawings, the drive-screw fastener 2 shown in FIG. 1 comprises a head 1, shown in phantom lines. The shank is composed of a series of members having triangular bases 3a, 3b . . . 3k interconnected by three-sided frusto-pyramidal portions 4a, 4b . . . 4h which taper in the direction away from head 1. Furthermore, the triangular bases may decrease progressively in size in the same direction to give the shank an over-all taper toward the point 5. The upper surfaces of the bases provides a series of progressively smaller shoulders 6. The neck 7 between the head and shank is triangular in transverse cross-section or any other desired shape. Its area in transverse cross-section is considerably less than the smallest area of the adjacent frusto-pyramids 4a, 4b, etc., so that, when the head 1 is turned the drive screw is tightly seated in the members coupled thereby, the head will twist off the shank at the neck 7. The entire drive screw fastener is made of an elastically deformable, synthetic polymer such as polystyrene, impact-resistant nylon, or other suitable polymer.

FIG. 1 also shows two substantially flat pieces 8 and 9, each of which is provided with an opening. Pieces 8 and 9 are attachable to one another by use of drive-type screw fastener 2. Opening 10 in piece 8 is circular, but also may be of any other configuration which permits shank of fastener 2 (but not head 1) to pass therethrough. Opening 11 in piece 9 has a triangular configuration complementary to that of triangular bases 3a–3k. Opening 11 is a size smaller than bases 3a and 3b so that, when fastener 2 is driven thereinto, the shoulder formed by base 3a is slightly deformed and tightly seated in opening 11 and the face formed by base 3b is seated against the outer face of member 9 about opening 11. The drive screw is, of course, prevented from rotating in opening 11 by the mutually complementary noncircular configurations of the triangular shoulder of base 3a and opening 11.

Neck 4 of fastener 2 is designed to break when head 1 is turned relative to shank 3. The neck may conveniently be rendered breakable in many ways. For example, neck 4 in FIG. 1 has substantially smaller cross-section than shank 3 and head 1. Thus, when sufficient rotational force is applied to head 1, shank 3 being prevented from rotating in the opening 11 of piece 9, neck 4 breaks, permitting head 1 to be severed from shank 3. Pieces 8 and 9 may then be separated. After separation of pieces 8 and 9, shank 3, which remains anchored in piece 9, may be removed by tapping with a suitable driving implement.

FIGS. 2 and 4 illustrate another embodiment of the instant drive screw fastener. FIG. 2 shows a thermoplastic, synthetic polymer fastener 12 in position holding pieces 13 and 14 together. Fastener 12 has a round head 15, with a slot 16 therein of sufficient size to receive the blade of a screw driver. Shank 17, composed of a series of progressively smaller four-sided frusto-pyramids with substantially square bases, tapers to a point 18 at its lower end. A plurality of shoulders 19 are formed on shank 17. The shoulders have substantially square periphery. The shoulders 19 have substantially flat upper surfaces or faces 20, and are designed to anchor against the lower face of piece 14 about the opening. Opening 21 in piece 13 is of sufficient diameter to permit shoulders 19 to pass freely therethrough. Opening 21 is not so large as to allow head 15 to pass, however.

Head 15 and shank 17 are connected by a breakable neck 22. Neck 22 at its narrowest point is substantially smaller than shank 17 and is breakable when head 15 is rotated relative to shank 17. Shank 17 is prevented from rotating by the complementary square opening in piece 14. Thus, when head 15 is rotated by a screw driver or the like, neck 22 breaks and head 15 may be then severed and removed, in turn permitting piece 13 to be separated from piece 14.

It will be appreciated that the normal size of the openings which are shaped similar to and grip the shoulder portions of the shanks (e.g., opening 26 in FIG. 3, opening 11 in FIG. 1 or the opening in member 14 in FIG. 2) must be smaller than the size of the area defined by the periphery of the shoulders adjacent the head 1. Thereby, an upper surface of a shoulder bears about the opening against the outer face of the member in which the opening is located to lock positively the drive screw against withdrawal. The shoulder providing this locking function, however, must pass through the opening before it assumes the locking position. Therefore, either the member in which said opening is located and/or the shoulders on the drive screw must be deformable enough to allow the larger shoulder to be driven through the smaller opening and preferably must have sufficient elastic recovery to regain at least substantially its original size.

It is preferred that at least the shank or all of the drive screw be made from a synthetic, thermoplastic polymer which imparts an elastic, deformable quality to the shoulders so that they can be deformed elastically as they are driven through the opening. It is possible, however, to practice the invention with the drive screw made of either elastically deformable or essentially rigid material if the member corresponding to members 9, 14, and 24 in FIGS. 1, 2 or 3 is deformable elastically about the opening therein. In this instance, the opening enlarges as the shoulders of the drive screw pass through the opening, the latter regaining substantially its normal size after the shoulder passes therethrough whereby the shoulder seats against the face of the member about the opening and prevents withdrawal of the drive screw.

It will be appreciated further from FIG. 2 that only certain shoulders and faces of the total shoulders and faces may be functional in a given situation. For example, in the situation illustrated in FIG. 2, only shoulders 19a and 19b and face 20b are functional. Shoulder 19a is slightly deformed in the opening of member 14 and is tightly seated therein. Shoulder 19b, having deformed slightly as it was driven through the slightly smaller opening in member 14, has recovered elastically its original dimension so that its upper surface or face 20b bears against the outer face of the member 14 to lock the fastener against withdrawal. The shoulder 19c and remaining shoulders between it and tip 18 are nonfunctional in the illustrated situation. It is thus apparent that the frusto-pyramidal members forming the latter shoulders may be omitted or that the shank of the drive screw may be shortened without effect in this situation. However, it is preferred that the drive fasteners be made with shoulders along the length of the shank for drive fasteners made for use in a variety of applications, i.e., drive fasteners which can be used to hold together members of various thicknesses.

It is to be further noted that the tapered walls of segments of shank 17 (FIG. 2) and shank 3 (FIG. 1) are desirable because the taper facilitates the driving of the shoulders through the openings. The taper also facilitates the deformation of those shoulders which are larger than the opening. The faces of the shoulders, on the other hand, are parallel with the outer face of members 11 and 24 so that the said larger shoulders will not pull back through the openings once they are driven through.

FIG. 3 shows in detail two pieces 23, 24 suitable to be fastened together with a drive-type screw fastener having a substantially triangularly configured shank portion. Piece 23 has a circular opening 25, sufficiently large to permit the shank portion of a screw fastener to pass therethrough, but not large enough to permit the head portion thereof to pass. Opening 26 in piece 24 is of a configuration complementary to that of the fastener shank, whereby when said shank is driven thereinto, by a hammer or other suitable implement, the fastener is anchored and may neither be pulled out nor rotated.

Many configurations for the head portion of the screw fastener are possible. FIGS. 2 and 4 illustrate a circular head, with a slot adapted to receive a screw driver blade. FIGS. 5 and 6 illustrate suitable polygonal heads. Head 27 in FIG. 5 is square and head 28 in FIG. 6 is hexagonal. Both heads 27 and 28 may be turned by an appropriate wrench or pliers. The head portion of the screw fastener, however, is not limited to any particular circular or polygonal configuration, but may be of any design that permits it to be rotated and which provides a suitable surface for driving the fastener into workpieces with hammers and the like.

The shoulders on shank portion of the fastener may be of substantially any noncircular configuration. FIGS. 7, 8, 9, and 10 show in transverse cross-section, various possible shoulder shapes. Shank 29 in FIG. 7 in transverse cross-section is triangular, with rounded corners. Shoulders 30 on shank 29 are also triangular with rounded corners. Shank 31 in FIG. 8 in transverse cross-section is substantially square, with rounded corners, and formed thereon are two types differently configured shoulders 32 and 33. Shoulder 32 is circular in cross-section, whereas shoulder 33 is substantially square, with inwardly curving sides, and rounded corners. The latter shoulder must be seated in the similarly shaped opening of the member to make it nonrotatable relative to said member.

Shank 34 in FIG. 9 is of rectangular configuration in transverse section, being substantially longer than it is wide, with ends that are rounded. Formed on shank 34 are shoulders 35, which are elliptical. FIG. 10 shows shank 36, which, in transverse cross-section, is a V-notched circle. Shoulders 37, formed on shank 36, are circular, with one side cut away, to render them noncircular.

Many other possible configurations are possible for the shank and shoulder portions of the drive-type screw fastener. As in FIG. 8, shoulders of different shapes may be formed on one shank. It is only required that at least some of the shoulders be of noncircular configuration, so that the shank portion of the screw fastener when in place, as in FIG. 2, will not turn when rotational pressure is applied to the head portion.

As has hereinbefore been explained, the neck portion of the screw fastener may be rendered breakable in a number of ways. The preferred method for obtaining a breakable neck portion is to provide a neck portion with transverse dimensions substantially smaller than those of the adjacent shank and head portions.

The present screw fastener is designed to be driven into place with a hammer or other similar instrument. The shoulders on the shank portion of the screw fastener are not spiral in form, and hence, the drive screw fastener is not one to be driven in place by rotation. The shoulders, instead, have substantially parallel surfaces, at right angles to the longitudinal axis of the shank.

It is typically necessary that openings be preformed in the pieces to be attached. The openings are of such size, shape, and location that the pieces may easily and quickly be fastened together with the screw fasteners. It is possible, where the pieces to be attached are made of flimsy weak material, to merely drive the screw fasteners into place without performing the openings. It is preferred, however, that the openings be preformed in the pieces as hereinbefore explained.

The presently disclosed drive-type screw fasteners may be made of substantially any suitable material. However, it is preferred that they be formed from a high-impact plastic material. Examples of suitable plastic materials are high-impact polystyrene, thermoplastic acetal resins, such as "Delrin," and others. An advantage of screw fasteners made of plastic material is that they can be produced economically, even in different colors, if desired.

It is contemplated that the screw fasteners can be used to fasten substantially any materials together. The screw fastener is, however, particularly well-suited for use in conjunction with license plate holders, automobile door panels and the like. Another use, for which the screw fastener is adaptable is in conjunction with do-it-yourself kits. For instance, color-coded screw fasteners of different sizes and shapes could be provided in the kits. Thus, a person assemblying the kit would not be subjected to the often tedious and tiresome task of selecting a fastener of the appropriate size, but would only have to choose one of the proper color, as indicated in the kit instructions. Many other uses for the screw fasteners are possible, and the invention is not limited to any specific embodiments, but extends to any and all forms falling within the scope of the appended claims.

The invention is hereby claimed as follows:

1. A drive-type, colored thermoplastic polymer fastener with a twist-off head comprising a colored, thermoplastic polymer head member of regular polygonal shape, a shank of said polymer provided with a plurality of longitudinally spaced, transverse shoulders with non-circular, non-rectangular peripheries, flat, upper faces on said shoulders, said faces having respective planes at right angles to the axis of said shank, the respective sides of each shoulder being inclined from the respective upper face inwardly toward said axis and collectively forming a tapered, non-circular, non-rectangular body, and a breakable neck of said polymer connecting said head member and the upper end of said shank, said head member having larger transverse dimensions than the transverse dimensions of said shank, said neck having a smaller transverse cross-sectional area than the respective transverse cross-sectional areas of said head and said shank to make said neck weaker in torque strength than either said shank or said head, whereby said shank of said fastener may be driven into and tightly secured in an opening complementary in shape to the shape of said peripheries to fasten said member to another member and whereby said head may be twisted relative to said shank to cause said neck to shear when said fastener is to be removed, whereupon said shank, with the head removed therefrom, may be driven through said complementary opening.

2. A fastener as claimed in claim 1, wherein said non-circular, non-rectangular peripheries are substantially triangular in shape.

3. A fastener as claimed in claim 1, wherein said non-circular, non-rectangular peripheries are substantially oval in shape.

4. A fastener as claimed in claim 1, wherein said non-circular, non-rectangular peripheries are circles with one side of the circle cut across by a substantially straight line.

5. A drive-type, colored thermoplastic polymer fastener with a twist-off head comprising a colored, thermoplastic polymer head member with a slot therein of sufficient size to receive the blade of a screw driver, a shank of said polymer provided with a plurality of longitudinally spaced, transverse shoulders with non-circular, non-rectangular peripheries, flat, upper faces on said shoulders, said faces having respective planes at right angles to the axis of said shank, the respective sides of each shoulder being inclined from the respective upper face inwardly toward said axis and collectively forming a tapered, non-circular, non-rectangular body, and a breakable neck of said polymer connecting said head member and the upper end of said shank, said head member having larger transverse dimensions than the transverse dimensions of said shank, said neck having a smaller transverse cross-sectional area than the respective transverse cross-sectional areas of said head and said shank to make said neck weaker in torque strength than either said shank or said head, whereby said shank of said fastener may be driven into and tightly secured in an opening complementary in shape to the shape of said peripheries to fasten said member to another member and whereby said head may be twisted relative to said shank to cause said neck to shear when said fastener is to be removed, whereupon said shank, with the head removed therefrom, may be driven through said complementary opening.

6. A fastener as claimed in claim 5, wherein said non-circular, non-rectangular peripheries are substantially triangular in shape.

7. A fastener as claimed in claim 5, wherein said non-circular, non-rectangular peripheries are substantially oval in shape.

8. A fastener as claimed in claim 5, wherein said non-circular, non-rectangular peripheries are circles with one side of the circle cut across by a substantially straight line.

References Cited by the Examiner

UNITED STATES PATENTS

| | | | |
|---|---|---|---|
| 1,037,010 | 8/1912 | Irons | 85—5 |
| 1,054,824 | 3/1913 | Carlson | 85—5 |
| 1,453,952 | 5/1923 | Samanich | 85—5 |
| 1,971,726 | 8/1934 | Norwood | 85—5 |
| 2,202,896 | 6/1940 | Buchner et al. | 85—21 |
| 2,633,049 | 3/1953 | Anderson | 85—28 |
| 2,759,389 | 8/1956 | Corckran | 85—21 |
| 2,839,165 | 6/1958 | De Gasso. | |
| 2,853,913 | 9/1958 | Rapata | 85—5 |
| 3,006,443 | 10/1961 | Siler. | |
| 3,096,680 | 7/1963 | Dudgeon | 85—28 |

FOREIGN PATENTS

| | | |
|---|---|---|
| 286,139 | 3/1928 | Great Britain. |
| 916,048 | 1/1963 | Great Britain. |
| 66,286 | 8/1950 | Netherlands. |

EDWARD C. ALLEN, *Primary Examiner.*

RICHARD W. COOKE, JR., *Examiner.*

R. S. VERMUT, *Assistant Examiner.*